United States Patent [19]

Vahlstrom et al.

[11] Patent Number: 4,495,598
[45] Date of Patent: Jan. 22, 1985

[54] COMPUTER ROTATE FUNCTION

[75] Inventors: Richard Vahlstrom, Villa Park; Dennis R. Keats, Irvine; Peter T. Lee, Laguna Niguel, all of Calif.

[73] Assignee: McDonnell Douglas Corporation, Long Beach, Calif.

[21] Appl. No.: 427,947

[22] Filed: Sep. 29, 1982

[51] Int. Cl.³ .............................................. G06F 7/00
[52] U.S. Cl. .................................................. 364/900
[58] Field of Search ... 364/200 MS File, 900 MS File

[56] References Cited

U.S. PATENT DOCUMENTS 3,790,960 2/1974 Amdahl et al. ...................... 364/900

Primary Examiner—Raulfe B. Zache
Attorney, Agent, or Firm—Gregory A. Cone; George W. Finch; Donald L. Royer

[57] ABSTRACT

The rotate function of this invention involves cyclic shifts of 1 to 4 byte data by an amount of 0, 1, 2, or 3 bytes either to the left or to the right. Only one CPU firmware clock cycle is required regardless of the shift amount. This shifting is done either on data which is transferred from computer memory or on data prior to its transfer into computer memory. Firmware-controlled hardware shifts the bytes in the data field in response to information provided concerning the location of the most significant byte in memory relative to the boundaries of the data word and the length of the data word. The firmware can also directly specify the amount of the shift.

13 Claims, 3 Drawing Figures

4,495,598

COMPUTER ROTATE FUNCTION

BACKGROUND OF THE INVENTION

This invention relates to byte shifting functions carried out within a computer system. Still more particularly, this invention relates to a system for consecutively reordering of multi-byte word blocks when such are transferred between memory and CPU or CPU and memory.

The arithmetic logic unit (ALU) in a computer system which has the capability to handle multi-byte words in one clock cycle requires that the individual bytes be presented to the ALU in a particular order. Consider a 32-bit machine handles data words consisting of four 8-bit bytes which must be presented to the ALU in a specific order. Normally this is done with the most significant byte (MSB) first and the least significate byte (LSB) presented last, right-justified with the LSB having the highest memory address of the four bytes in the word. However, the end bytes of a 32-bit word block do not necessarily fall, when in memory, into the memory's double word boundary byte positions. In other words, a four-byte data word will usually fall into a position in the memory wherein it overlaps the double word boundaries in the memory. If this is so, the information will be read in an order which is not directly usable by the ALU. This being the case, the data word must somehow be reordered such that the individual bytes are consecutively reordered in proper fashion for their further processing by the ALU. Prior art computer systems which employ eight and sixteen bit processing schemes have handled any necessary reordering of data bytes by rotating either one or two bytes as necessary, one at a time, or rotating a full word one bit at a time on each firware clock cycle. The system of this invention provides the capabilty to rotate 4 byte data by any amount on byte intervals, in one firmware clock cycle.

SUMMARY OF THE INVENTION

A computer rotate function is implemented in a computer system which operates on multi-byte word blocks and includes at least a CPU and a memory by a system which comprises a rotation controller means which provides output command information to reorder the bytes in a multi-byte word block in response to input information describing the relative displacement of an end byte of a multi-byte word block from a double word boundary byte position, byte shifting means responsive to the command information which consecutively reorders the bytes in the multi-byte word block and means to transfer reordered multi-byte word blocks between the CPU and the memory.

DETAILED DESCRIPTION OF THE INVENTION

The rotate functon of this invention is a subsystem of the recently introduced SEQUEL TM computer system produced by Microdata Corporation, Irvine, Calif. The SEQUEL system is a large business system which is designed around the use of 32-bit (four-byte) data words. Since this is a full 32-bit machine, it is necessary that a rotate function be included in the overall system to avoid the serious time penalties which would arise if the individual eight-bit bytes within the 32-bit data words had to be reordered consecutively with each reordering operation taking a full clock cycle or if the reordering were done on the full 4 byte data one bit position at a time for each firmware clock. The remarks that follow will describe the implementation of the rotate function within the context of the SEQUEL computer system. However, it should be realized that other embodiments of the basic invention are possible, and that the true scope of the invention is defined by the appended claims.

Rotate operations in the SEQUEL system involve cycle shifts of zero, one, two, or three bytes, either to the right or to the left. Right shifts are used generally to "right-justify" arithmetic values for subsequent processing in the ALU. Left shifts are generally used to restore previously right shifted values prior to their reinsertion into system memory. In conjunction with right shifts, the rotate function in the SEQUEL systems provides for a "sign extend" that fills all leading zero positions with the value's sign bit if the data is less than 4 bytes in length, which is required for the internal handling of mathematical operations with the ALU. There is also a zero extend capability which is similar to sign extend as implemented in the SEQUEL system. The memory of the SEQUEL system is organized into sequential and contiguous four-byte groups which will be referred to in this discussion as variously "words" or "multi-byte word blocks." In these words, the byte significance (i.e., MSB, LSB) in a word decreases from left to right while the byte address in memory increases from left to right. The actual 32-bit data strings manipulated by SEQUEL system are organized into four-byte groups as follows:

| BYTE 3 | BYTE 2 | BYTE 1 | BYTE 0 |
| --- | --- | --- | --- |

Figure 1:
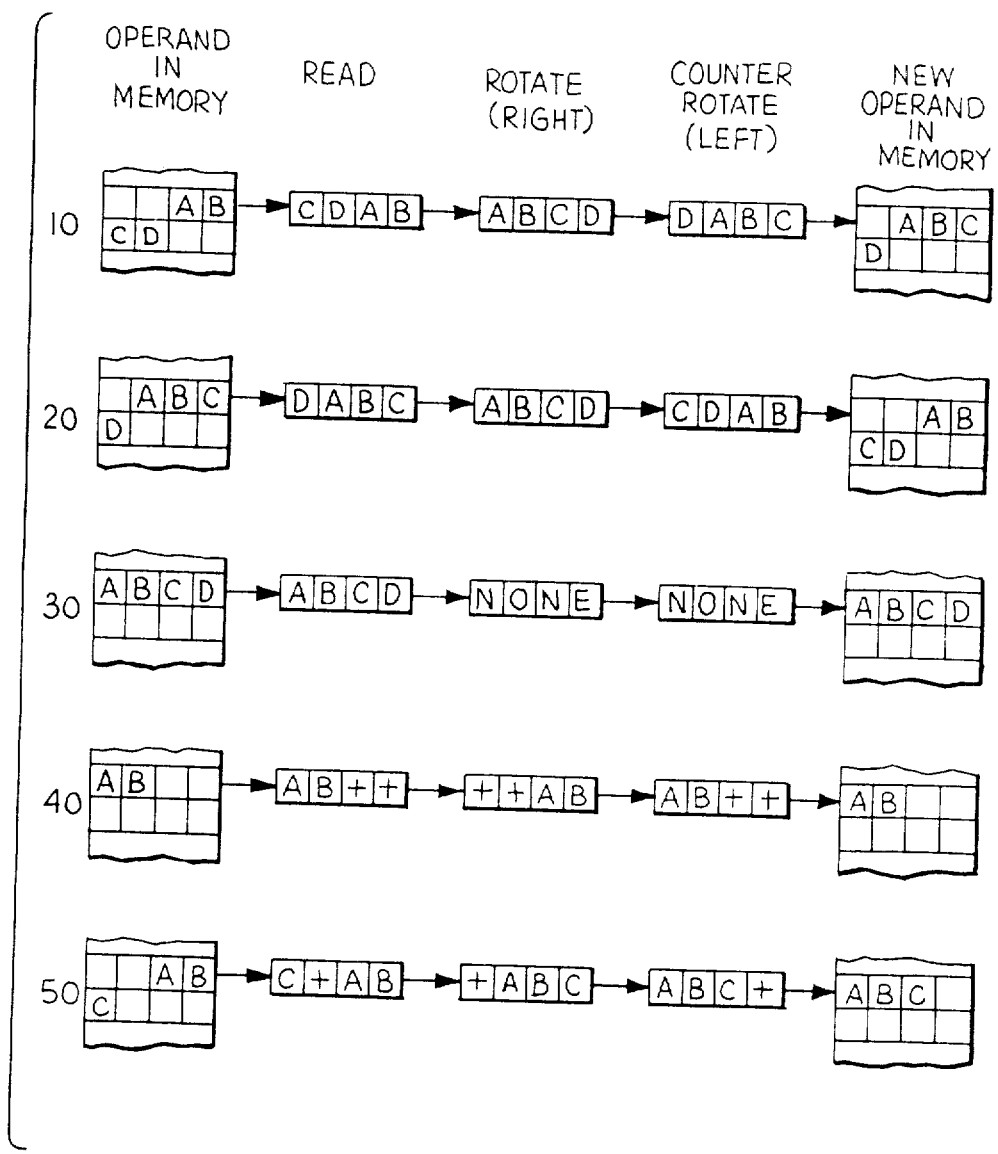
FIG. 1 is a diagrammatic representation of different examples of the use of the rotate function wherein various four-byte words are rotated out of memory into a format suitable for use by the ALU and then counter rotated back into memory.

Notice that this is a right justified word with the most significant byte (byte 3) at the left end of the data string. Although the data string must be in this format to be processed by the ALU, it is not necessarily in this order when it is stored in memory. The left hand column of FIG. 1, labelled operand in memory, shows the variety of different positions that the four-byte data word could assume when placed in memory. Note that byte 3 is now A, byte 2 is B, byte 1 is C, and byte zero is D in the figure. Notice that the operand in memory column for rows 10 and 20 of FIG. 1 shows a four-byte data word which has been placed in memory such that it overlaps the double word memory boundaries represented by the lateral edges of the memory blocks shown in this column. When the data word is retrieved from the memory and placed into the memory read register, it is formatted as shown in the read column of FIG. 1. Thus, the sequence of the bytes in the read column in row 10 is C, D, A, B. It is one of the functions then of the rotate circuits to reorder this data contained in the memory read register to the format required by the ALU microprocessor, A, B, C, D. The rotated data word with the reordered bytes is shown in the rotate column. The "(right)" indicates that the rotation has been performed such that the reordered multi-byte word is a right justified word. For the example shown in row 10, the rotation is accomplished by a two-byte cyclic right shift. Finally, if the data word were to be returned to the same memory location as shown in the operand and memory column, the rotation circuits would again be employed to counter rotate (a two-byte cyclic left shift) the data word back to its original format. However, in row 10 of FIG. 1 the example is shown for a situation in which the operand is to be placed into a new position in memory shown in the "new operand in memory column." To prepare the data word for this new memory position, the multi-byte data word is counter rotated (left) to the order D, A, B, C. The word is placed in a memory write register prior to its entry into the memory. Row 20 of FIG. 1 portrays a process similar to that found in row 10. Row 30 of FIG. 1 shows a condition in which no rotation is necessary since the data word in memory has happened to be properly aligned within the memory block such that it enters the memory read register in the proper order to be directly used by the ALU. In this case, the rotate functions are not necessary and are not used. Also in row 30, the data word is written directly back into a memory block in the same order in which it came out of memory, and hence no counter rotate is necessary. Row 40 shows a condition in which there are only two bytes in a data word. The ALU in the SEQUEL system cannot handle this data word directly, and the sign extend function has been employed here. The rotate function has rotated the A and B bytes to the right for the right justified word and has filled the left two bytes with the sign value for the word. The two-byte word is then counter rotated back into the memory write register and from there into the memory as shown. Row 50 of FIG. 1 shows a process similar to that found in row 40 except for the use of a three-byte data word instead of a two-byte word as in row 40.

The rotate circuits have an ancilliary capability called a "fill" function. This permits any byte of a four-byte word to be duplicated in the other three bytes. That is, with byte 2 selected as the pattern byte, the word:

| 0 1 1 0 | 1 1 1 1 | 0 0 1 0 | 1 0 1 0 |
|---|---|---|---|
| BYTE-3 | BYTE-2 | BYTE-1 | BYTE-0 |

Can be "FILLED" to:

| 1 1 1 1 | 1 1 1 1 | 1 1 1 1 | 1 1 1 1 |
|---|---|---|---|
| BYTE-3 | BYTE-2 | BYTE-1 | BYTE-0 |

This fill capability is particularly useful for some of the operations performed by the CPU.

The rotate function, along with many of the functions carried out by the SEQUEL computer system, is controlled by firmware. In the SEQUEL system the rotate functions, along with the ALU and address computate functions, share the same instruction register. Therefore, certain of the bits in the controlling firmware word uniquely identify a particular instruction as one applicable to the rotate function. Such an instruction also contains bits which block ALU output activity during the rotate instruction cycle.

Figure 2:
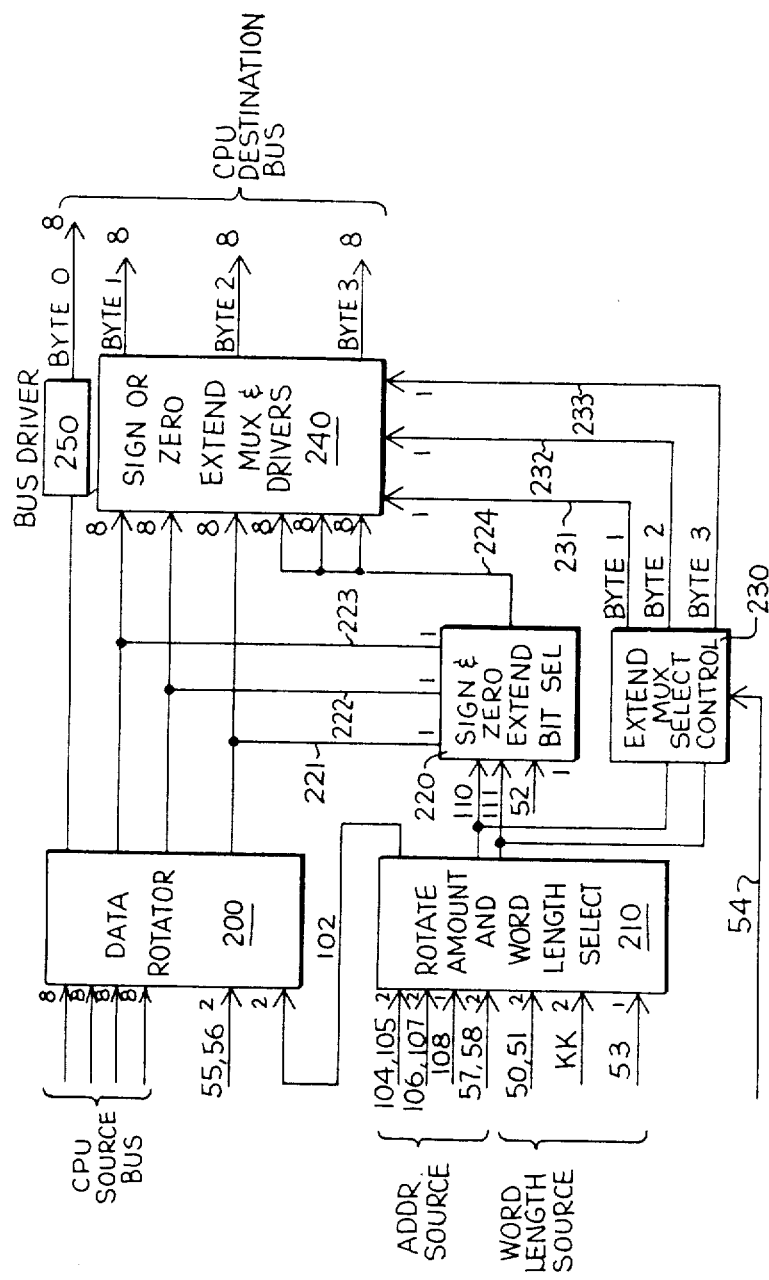
FIG. 2 is a schematic block diagram of the firmware controlled hardware layout of the system of the rotate function as implemented in the SEQUEL computer system.
Figure 5:
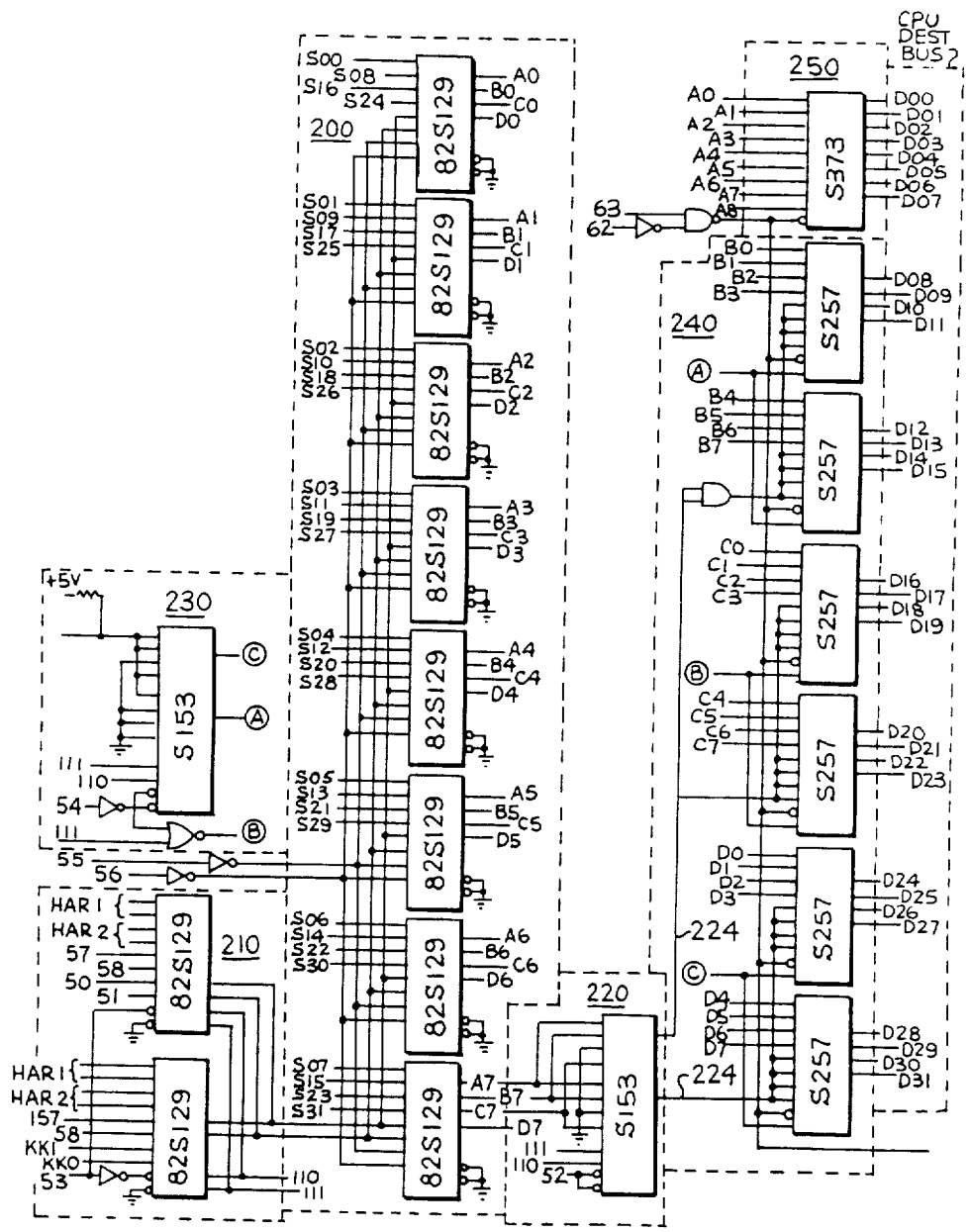

Selection of the particular source of the 32-bit, four-byte data string that is to be rotated is controlled by four bits of the firmware word which is latched into the instruction register, not shown. The rotate function has generally the same sources as the ALU; however, it normally will use only two in the SEQUEL system, the "X" register and the memory read register. Usually the memory read register is the source when the data is coming from memory or a peripheral device prior to processing, while the "X" register is a source for data following processing, for data going back to memory, or a peripheral device via the memory write register. Note that for either input the desired data must have been loaded into the source register "X" or memory read during an instruction cycle previous to the rotate instruction cycle. Whichever the case, the input multi-byte word will be entered into the rotate function via the CPU source bus as shown in FIG. 2.

For either input, the length of the input string must be qualified. In this particular system, this qualification is controlled by input line 53 which is a pointer to the qualification data. If bit 53 is a zero, this indicates that the word length is contained explicitly in the firmware word itself, which in turn is described over lines 50 and 51. If line 53 is a one, the word length is contained in a source assembly instruction (operation system assembly code) from which the firmware word was derived and enters the rotate function via line KK. The bit pattern for lines 50 and 51 is as follows:

| BITS | | QUALIFIED WORD LENGTH |
|---|---|---|
| 51 | 50 | |
| 0 | 0 | 1-BYTE |
| 0 | 1 | 2-BYTES |
| 1 | 0 | 4-BYTES |
| 1 | 1 | 3-BYTES |

The final piece of information regarding the input string that is needed by the rotate circuits is the location of the most significant byte (MSB) of the input which gives the arrangement of the bytes in the memory read register. This arrangement is a factor of how the word was stored in memory. This information is derived from the memory address of the most significant byte of the input string. This address and the implyed byte arrangement is referred to by an address pointer which is embodied in bits 57 and 58 which are input into a rotation controller shown as the rotate amount and word length select functional block 210 in FIG. 2. These two bits reference the particular registers that contain the memory address of the data being brought into the memory read register from memory. The contents of these registers are input into block 210 over lines 104, 105 and 106, 107. Zero address is coded directly in functional block 210. Line 104, 105 is from a first hardware address register (HAR1, not shown) and line 106, 107 is from a second hardware address register (HAR2, not shown). The address pointer then selects or combines these two registers according to the following bit pattern:

| BITS | | REFERENCED ADDRESS SOURCE |
|---|---|---|
| 58 | 57 | |
| 0 | 0 | HAR1 |
| 0 | 1 | HAR2 |
| 1 | 0 | HAR1 - HAR2 |

| BITS | | REFERENCED ADDRESS SOURCE |
|---|---|---|
| 1 | 1 | 0 |

In more detail, block 210 contains two ROM's with outputs tied together. These ROM's decode all of the information which determines the amount of rotation. This information is passed to the data rotator 200 and to the sign or 0 extend bit selector 220. The first ROM is used for firmware designated word lengths and the second ROM is used for word length designations implicit in the software field kk. The following Table 1 shows the coding for the two ROM's. The rotation amount is shown as a function of the word length and the address value.

TABLE 1

ROTATE AMOUNT AS A FUNCTION OF HAR BITS 0, 1 AND WORD LENGTH

| HAR | kk | WORD LENGTH | ROTATE AMOUNT |
|---|---|---|---|
| 0 | 00 | 1 | 3 |
|  | 01 | 2 | 2 |
|  | 11 | 3 | 1 |
|  | 10 | 4 | 0 |
| 1 | 00 | 1 | 2 |
|  | 01 | 2 | 1 |
|  | 11 | 3 | 0 |
|  | 10 | 4 | 3 |
| 2 | 00 | 1 | 1 |
|  | 01 | 2 | 0 |
|  | 11 | 3 | 3 |
|  | 10 | 4 | 2 |
| 3 | 00 | 1 | 0 |
|  | 01 | 2 | 3 |
|  | 11 | 3 | 2 |
|  | 10 | 4 | 1 |

In summary with information regarding the input data source, the length of the word to be rotated, the rotation circuits can perform the rotation of the desired number of bytes. Command information is transmitted from the rotation controller to the data rotator over lines 102. Command information is transmitted from the rotation controller to the data rotator over line 102. The particular direction of rotation, be it left or right, is contained in a separate command.

The rotation process in the data rotator 200 is commanded by bits 55 and 56 of the firmware word which has been latched into the instruction register, not shown. These two bits command the direction of rotation which for the SEQUEL system is right on input from memory and left on output to memory as well as the fill facility and a straight through (no rotation) when a sign extension is required with no rotation. The bit patterns are:

| BITS | | ROTATION COMMAND |
|---|---|---|
| 56 | 55 | |
| 0 | 0 | ROTATE RIGHT |
| 0 | 1 | ROTATE LEFT |
| 1 | 0 | FILL |
| 1 | 1 | STRAIGHT THROUGH (NO ROTATION) |

In the case where a right rotation is being performed on a value to align it for ALU processing, the sign extend or zero extend facility can be invoked. For ALU processing, the sign bit must be in the left-most bit position. The sign extend facility performs the desired transportation of the sign bit. In the same manner, a zero bit can be extended instead of a sign bit. Sign bit extension is controlled by bit 54 while zero bit extension is controlled by bit 52, both shown in FIG. 2. The bit patterns for these two commands are:

| BIT | SIGN EXTEND COMMAND | BIT | ZERO EXTEND COMMAND |
|---|---|---|---|
| 54 | | 52 | |
| 0 | NO SIGN EXTEND | 0 | NO ZERO EXTEND |
| 1 | INVOKE SIGN EXTEND | 1 | INVOKE ZERO EXTEND |

The data rotator 200 consists of a set of ROM's which decode the input data, rotate type, and rotate amount and generate the rotated data. There is one ROM for each data bit. All 8 ROM's are identical. Functionally, the rotator ROM for a given bit position, say the 6-bit, has the ability to transfer the input bits in this position from the 4 input bytes into the same or into different output bytes, but still in the same bit position, that is, 6. The amount of rotation is controlled by inputs into the ROM relating to the type and the amount of rotation. This controlled cross-connection capability is one of the key features of the rotate function.

Lines 110 and 111 in FIG. 2 between the rotate amount and word length select block 210 and the sign or 0 extend bit selection block 220 convey word length information which specifies which byte to use for sign extension value (bit 7) in which bytes are to be sign extended. An alternative would be to use the rotator output information for the same purpose. For the sign extension bit (bit 7), if the word length is 1, 2, 3, or 4 bytes, then the bit 7 source will take the sign value from the byte 0, byte 1, byte 2, or none bytes respectively. Correspondingly, if the word length is 1, 2, 3, or 4 bytes, the byte positions which will then hold the extended sign will be bytes 1, 2 and 3; bytes 2 and 3; byte 3; or no bytes, respectively. If the command bit (FW54) equals 0, all the bytes will be set directly to the rotator output. By way of further explanation for the sign extension function, two functions must be specified for the sign extension. The bytes which will be set with the sign extended value rather than the director rotator output value must be specified. Also, the particular bit 7, whether from byte 0, 1 or 2 to be used as the sign extended value must be specified or, in the alternative, if the 0 extend function is not required, this must also be specified. Bytes 1, 2, and 3 may be either sign extended or the direct output of the rotator. Byte 0 is always the output of the rotator. The sign extension 7 bit information is conveyed from the 220 block to the multiplexors in the 240 block via lines 221, 222 and 223 shown in FIGS. 2 and 3.

Table 2 below summarizes the various firmware command bits which have been discussed above.

TABLE 2

| ROTATE FIRMWARE COMMAND BITS | | | | | | |
|---|---|---|---|---|---|---|
| 58 57 | 56 55 | 54 | 53 | 52 | 51 | 50 |
| ADDR SELECT | MODE SELECT | SIGN EXT. OR | WORD LNGTH SOURCE | ZERO EXT. (USED | FIRMWARE DESIGNATED | |
| 0 H1 | RIGHT | ZERO | SELECT | ALONG | WORD LENGTH | |
| 1 H2 | LEFT | EXT. | FW | WITH | | |
| 2 H1/H2 | FILL | SELECT | OR | 54) | | |
| 3 0 | THRU | kk Also | | | | |

TABLE 2-continued

| ROTATE FIRMWARE COMMAND BITS | | | | | | | | |
|---|---|---|---|---|---|---|---|---|
| 58 | 57 | 56 | 55 | 54 | 53 | 52 | 51 | 50 |
| | | called rotate type | | | | | | |

FIG. 3 is a detailed schematic drawing of the rotate system. The rotator circuits shown in FIG. 2 as the 200 block appear in FIG. 3 as the 8 ROM chips. These are all 82S129 chips which have the CPU source bus as their inputs and the inter-connecting lines to the sign or 0 extend multiplexer block 240 as their outputs. The CPU scourse bus inputs are labelled 500-532. The inter-connecting lines are A0-D7. Additional inputs into the data rotator block 200 include the firmware bit lines 55 and 56 as well as the input from the rotate amount and word length select block 210. This block comprises 2 ROM's, again 82S129's, which both have as inputs 4 lines from the hardware address registers, HAR1 and HAR2, into each of the two ROM's. Also, both ROM's have inputs from firmware bits 57 and 58 and 53. One of the ROM's has two additional input lines from firmware bits 58 and 51 while the other ROM has two input lines from the k field as discussed above. The outputs from the 210 block comprise a rotation amount output over the lines 102 and 111 and word length information over double lines 110 which is passed to blocks 220 and 230. Block 220 is the sign or 0 extend bit selection block. It has as its input the double lines 110 and firmware bit 52. It is interconnected on one side with the particular ROM and the rotate block 200 which handles the 7 bit position. It also provides an output to the various multiplexers via lines 221, 222, 223 and the 240 block via line 224. The 230 block is the extend MUX select control block. It, like the 220 block, uses a single S153 chip. The 230 chip has as its inputs the lines 110 and 111 and firmware bit 54. Its three outputs 231, 232, 233 select the various bytes, 1, 2, and/or 3, for the sign or 0 extend function. Block 240 comprises the 6 multiplexers (S257's) which control the sign or 0 extend function. These chips have as their inputs the various outputs from the rotator chips and the byte select lines from the 230 block and the output line from the 220 block. The output of the sign or 0 extend multiplexer block is the CPU destination bus. Note that this block affects only bytes 1, 2 and 3, not byte 0. Block 250 is the bus driver for the byte 0. It is an S373 chip which has as its input the 8 bits of the 0 byte from the rotator block 200 (A0-A8) and enable inputs over the firmware bit lines 62 and 63 which are shared also by the 240 block chips as shown.

The output of the rotation circuits is a 32-bit, four byte string. This output is placed on the CPU destination bus as shown by the bracket in FIG. 2 and labelled as D00-D31 in FIG. 3. The specific destination of the data string is controlled by other firmware bits on the firmware word latched into the instruction register, not shown. These destinations are the same as the ALU destinations. However, normally the only two destinations used by the rotate function are the memory write register and the "X" register.

Turning again to FIG. 2 for a brief overview of the operation of these circuits, the rotation controller is the rotate amount and word length select block labelled 210. The various information and command inputs onto the left edge of this block control the rotation amount which is input over line 102 into the data rotator 200 which can be termed a byte shifting means. The data rotator then reorders the input bytes received from the CPU source bus in response to this command information conveyed via line 102. The sign and zero extend block 220 controls the sign extend and zero extend functions described above. Block 230 controls the MUX selection between sign extension or the data output from the rotator for bytes 1, 2 and 3. Sign or zero extend MUX block 240 actually performs the various functions commanded by blocks 220 and 230 upon the input bytes from the data rotator. Byte zero has a separate bus driver 250 since it is not affected by the sign or zero extend logic as may be bytes 1, 2 and 3. The four-byte output is then fed onto the CPU destination bus as shown.

What is claimed is:

1. In a computer system comprising central processing unit (CPU) means which operates on multi-byte word blocks and memory means, a rotation system comprising:
   rotation controller means which provide output command information to reorder bytes in a multi-byte word block in response to input information describing the relative displacement of an end byte of a multi-byte word block from a double word boundary byte memory position;
   byte shifting means responsive to the command information which consecutively reorder the bytes in the multi-byte word block; and
   means to transfer reordered multi-byte word blocks between the CPU means and the memory means.

2. The system of claim 1 further comprising zero extend means whereby non data containing bytes are filled with zeros.

3. The system of claim 1 further comprising sign extend means wherein non data containing bytes are filled with the algebraic sign of the data in the data containing bytes of the word block.

4. The system of claim 1 further comprising fill function means whereby the information may be emplaced into all of the remaining bytes of the multi-byte word block.

5. A data rotation system for use in a computer system for reordering the sequence of the individual bytes in a 4-byte data word comprising:
   data rotator means comprising a plurality of first ROM devices responsive to commands from mode selector means and rotation amount controller means wherein the plurality of ROM devices is organized with a 32-bit, 4-byte input and a 32-bit, 4-byte output such that the 4 bits from each of the individual bit positions of the 4 input bytes of the data word are processed separately and simultaneously by the ROM devices which output the 4 bits at each of the individual bit positions of the 4 output bytes in an order responsive to the commands.

6. The system of claim 5 wherein the mode selector has the capability to select between right rotations, left rotations, and no rotation in response to mode select commands from the computer system.

7. The system of claim 5 wherein the rotation amount controller means comprises at least one ROM device of a second type, coded to convert information from the computer system relating to the position of the bytes in main memory into the commands to the data rotator means.

8. The system of claim 7 wherein the second type ROM is the same as the first type ROM.

9. The system of claim 5 further comprising sign extension logic embodied in ROM means of a third type which supplies commands to the data rotation system to substitute algebraic sign bits for selected bits in the data word in response to sign information from the computer system.

10. The system of claim 5 further comprising zero extension logic embodied in ROM means of a fourth type which supplies commands to the data rotation system to substitute zero bits for selected bits in the data word in response to zero information from the computer system.

11. A system of claim 9 or claim 10 further comprising a plurality of multiplexer means which select between commands from the sign extension logic and the zero extension logic and the processed output bytes from the ROM devices of the first type, the selected multiplexer output being passed to a data rotation system output bus means.

12. The system of claim 11 wherein the data rotation system output bus means is the central processing unit destination bus of the computer system.

13. The ystem of claim 5 wherein the data word is input to the data rotation system over a central processing unit source bus means.

* * * * *